United States Patent
Kawakami

(10) Patent No.: US 12,511,035 B2
(45) Date of Patent: Dec. 30, 2025

(54) SOFT KEYBOARD DISPLAY METHOD AND INFORMATION TERMINAL

(71) Applicant: CASIO COMPUTER CO., LTD., Tokyo (JP)

(72) Inventor: Gou Kawakami, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/028,090

(22) PCT Filed: Aug. 20, 2021

(86) PCT No.: PCT/JP2021/030624
§ 371 (c)(1),
(2) Date: Mar. 23, 2023

(87) PCT Pub. No.: WO2022/064921
PCT Pub. Date: Mar. 31, 2022

(65) Prior Publication Data
US 2023/0333733 A1    Oct. 19, 2023

(30) Foreign Application Priority Data

Sep. 24, 2020   (JP) ................................ 2020-159839

(51) Int. Cl.
*G06F 3/048* (2013.01)
*G06F 3/04886* (2022.01)
(Continued)

(52) U.S. Cl.
CPC ......... *G06F 3/04886* (2013.01); *G06Q 50/20* (2013.01); *G09B 7/04* (2013.01)

(58) Field of Classification Search
CPC ..... G06F 3/04886; G06F 3/023; G06Q 50/20; G09B 7/04; G09B 7/02; G09B 19/00
See application file for complete search history.

(56) References Cited

U.S. PATENT DOCUMENTS

2004/0183834 A1* 9/2004 Chermesino ........ G06F 3/04886
  715/773
2004/0212595 A1* 10/2004 Zhou ................... G06F 3/04886
  345/168

(Continued)

FOREIGN PATENT DOCUMENTS

CN    107797963 A  *  3/2018  ............. G06F 17/11
JP    2004093915 A  *  3/2004

(Continued)

OTHER PUBLICATIONS

Lexia Reading Core5 Teacher's Manual (2015) (available at https://campussuite-storage.s3.amazonaws.com/prod/1213978/583ade96-581b-11e7-99ef-124f7febbf4a/1625496/c3eefcda-9137-11e7-919e-0a6f7528b5c2/file/C5TeachersGuide_ALL.pdf) (Year: 2015).*

(Continued)

*Primary Examiner* — Rashawn N Tillery
(74) *Attorney, Agent, or Firm* — Scully, Scott, Murphy & Presser, P.C.

(57) ABSTRACT

A soft keyboard display method performed by a processor of a server having a communication function with a first information terminal that is used by a first user, the soft keyboard display method includes a processor performing obtaining first user information about the first user, and adjusting an aspect of a soft keyboard to be displayed on the first information terminal, based on the first user information about the first user.

14 Claims, 11 Drawing Sheets

(51) Int. Cl.
*G06Q 50/20* (2012.01)
*G09B 7/04* (2006.01)

(56) References Cited

U.S. PATENT DOCUMENTS

| | | | | |
|---|---|---|---|---|
| 2010/0060585 | A1* | 3/2010 | Chiu | G06F 3/04886 |
| | | | | 345/173 |
| 2010/0231523 | A1* | 9/2010 | Chou | G06F 3/018 |
| | | | | 345/173 |
| 2012/0206363 | A1* | 8/2012 | Kyprianou | G06F 3/04886 |
| | | | | 345/168 |
| 2013/0122481 | A1* | 5/2013 | Rovner | G09B 7/04 |
| | | | | 434/350 |
| 2013/0241837 | A1* | 9/2013 | Oga | G06F 3/04886 |
| | | | | 345/168 |
| 2015/0100913 | A1* | 4/2015 | Park | G06F 3/0238 |
| | | | | 715/773 |
| 2015/0104778 | A1* | 4/2015 | Liu | G09B 5/08 |
| | | | | 434/335 |
| 2016/0012745 | A1* | 1/2016 | Olsen | G09B 13/04 |
| | | | | 434/227 |
| 2016/0070441 | A1* | 3/2016 | Paek | G06F 3/0485 |
| | | | | 715/773 |
| 2016/0133147 | A1* | 5/2016 | Deane | G09B 7/02 |
| | | | | 434/353 |
| 2017/0256174 | A1* | 9/2017 | Goodfriend | H04W 12/12 |
| 2017/0280272 | A1* | 9/2017 | Tanaka | H04L 67/55 |
| 2018/0188949 | A1* | 7/2018 | Kaye | G06F 1/1626 |
| 2018/0210613 | A1 | 7/2018 | Chen et al. | |
| 2019/0303598 | A1* | 10/2019 | Kawakami | G06F 21/629 |
| 2021/0374391 | A1* | 12/2021 | Jorasch | G06V 40/19 |
| 2021/0407310 | A1* | 12/2021 | Finch | G06F 40/40 |
| 2022/0068154 | A1* | 3/2022 | Breed | G06V 10/82 |
| 2022/0284825 | A1* | 9/2022 | Inoue | G09B 7/02 |
| 2024/0296751 | A1* | 9/2024 | Fieldman | G09B 7/04 |

FOREIGN PATENT DOCUMENTS

| | | | |
|---|---|---|---|
| JP | 2014192687 A | * | 10/2014 |
| JP | 2015513159 A | | 4/2015 |
| JP | 2018045281 A | | 3/2018 |
| JP | 2018534662 A | | 11/2018 |

OTHER PUBLICATIONS

International Search Report dated Oct. 26, 2021 issued in PCT/JP2021/030624.
CN First Office Action dated Mar. 28, 2025 issued in CN Appl 202180065539.3.

* cited by examiner

FIG. 3C
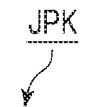
FIG. 3D
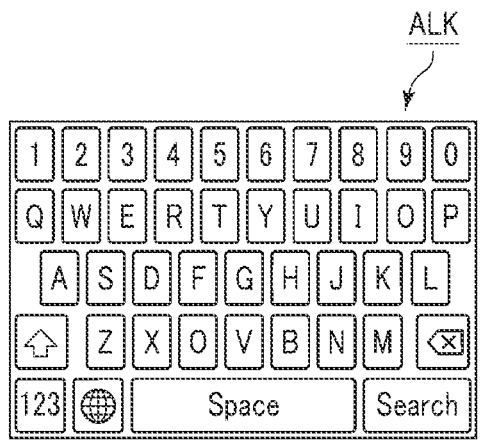
FIG. 4
| TEACHER ID | NAME | SCHOOL | CLASS IN CHARGE |
|---|---|---|---|
| 123 | ABC | O SCHOOL | FOURTH GRADE, CLASS B |
| ⋮ | ⋮ | ⋮ | ⋮ |
12e (TEACHER DB)

FIG. 5A

○ SCHOOL ▯ ...

12f (CLASS-BASED EDUCATIONAL PROGRESS TABLE)

| FIRST GRADE, CLASS B ▷ | SECOND GRAD, CLASS B ▷ | THIRD GRADE, CLASS B ▷ | FOURTH GRADE, CLASS B ▷ |
|---|---|---|---|
| (FIRST GRADE OF MIDDLE SCHOOL) | (SECOND GRADE OF MIDDLE SCHOOL) | (THIRD GRADE OF MIDDLE SCHOOL) | (FIRST GRADE OF HIGH SCHOOL) |
| ALGEBRA | ALGEBRA | MATHEMATICS I  MATHEMATICS A | MATHEMATICS II  MATHEMATICS B |
| NEGATIVE AND POSITIVE NUMBERS ✓ | CALCULATION OF EXPRESSION ✓ | NUMBERS AND EXPRESSIONS ✓ | EXPRESSION AND PROOF |
| LETTER EXPRESSION ✓ | QUADRATIC EQUATION ✓ | QUADRATIC FUNCTION ✓ | EQUATION OF HIGHER ORDER |
| LINEAR EQUATION ✓ | SQUARE ROOT ✓ | GEOMETRY AND MEASUREMENT ✓ | FIGURES AND EQUATIONS |
| SIMULTANEOUS EQUATION ✓ | FUNCTION | DATA ANALYSIS ✓ | TRIGONOMETRIC FUNCTION |
| INEQUALITY | | PROCESSING OF NUMBERS ✓ | EXPONENTIAL FUNCTION |
| GEOMETRY | GEOMETRY | NUMBER OF CASES AND PROBABILITIES ✓ | LOGARITHMIC FUNCTION |
| PLANE FIGURE ✓ | SIMILAR DRAWINGS ✓ | PROPERTIES OF INTEGERS ✓ | DIFFERENTIAL METHO- |
| SPACE FIGURE ✓ | CIRCLE ✓ | PROPERTIES OF FIGURES ✓ | INTEGRATION METHOD |
| INVESTIGATION METHOD OF FIGURES ✓ | PYTHAGOREAN THEOREM ✓ | | PLANE VECTOR |
| TRIANGLE AND SQUARE ✓ | | | SPACE VECTOR |
| | | | SEQUENCE |

FIG. 5B

| ○ SCHOOL ... | | | | | |
|---|---|---|---|---|---|
| FIRST GRADE, CLASS B △ | | SECOND GRAD, CLASS B △ | | THIRD GRADE, CLASS B △ | FOURTH GRADE, CLASS B △ |
| (FIRST GRADE OF MIDDLE SCHOOL) | | (SECOND GRADE OF MIDDLE SCHOOL) | | (THIRD GRADE OF MIDDLE SCHOOL) | (FIRST GRADE OF HIGH SCHOOL) |
| ALGEBRA | | ALGEBRA | | MATHEMATICS I  MATHEMATICS A ✓ | MATHEMATICS II  MATHEMATICS B |
| NEGATIVE AND POSITIVE NUMBERS | ✓ | CALCULATION OF EXPRESSION | ✓ | NUMBERS AND EXPRESSIONS ✓ | EXPRESSION AND PROOF |
| LETTER EXPRESSION | ✓ | QUADRATIC EQUATION | ✓ | QUADRATIC FUNCTION ✓ | EQUATION OF HIGHER ORDER |
| LINEAR EQUATION | ✓ | SQUARE ROOT | ✓ | | FIGURES AND EQUATIONS ✓ |
| SIMULTANEOUS EQUATION | ✓ | FUNCTION | | GEOMETRY AND MEASUREMENT ✓ | TRIGONOMETRIC FUNCTION |
| INEQUALITY | ✓ | | | DATA ANALYSIS ✓ | EXPONENTIAL FUNCTION |
| | | | | | LOGARITHMIC FUNCTION |
| | | | | PROCESSING OF NUMBERS ✓ | |
| GEOMETRY | | GEOMETRY | | NUMBER OF CASES AND PROBABILITIES ✓ | DIFFERENTIAL METHO· INTEGRATION METHOD |
| PLANE FIGURE | ✓ | SIMILAR DRAWINGS | ✓ | | |
| SPACE FIGURE | ✓ | CIRCLE | ✓ | PROPERTIES OF INTEGERS ✓ | PLANE VECTOR |
| INVESTIGATION METHOD OF FIGURES | ✓ | PYTHAGOREAN THEOREM | ✓ | PROPERTIES OF FIGURES ✓ | SPACE VECTOR |
| TRIANGLE AND SQUARE | ✓ | | | | SEQUENCE |

12h (EDUCATIONAL PROGRESS-BASED KEY TYPE TABLE)

| EDUCATIONAL PROGRESS | KEY TYPE | | FOUR ARITHMETIC OPERATIONS | EQUATION | TRIGONOMETRIC FUNCTION | EXPONENTIAL LOGARITHM | GRAPH | PROGRAM |
|---|---|---|---|---|---|---|---|---|
| | LOW | HIGH | | | | | | |
| ELEMENTARY SCHOOL | 1 | | 1 | 0 | 0 | 0 | 0 | 0 |
| MIDDLE SCHOOL | 1 | 2 | 1 | 1 | 0 | 0 | 0 | 0 |
| | | 3 | | | | | | |
| HIGH SCHOOL | 1 | 2 | 1 | 1 | 1 | 1 | 1 | 0 |
| | | 3 | | | | | | |
| UNIVERSITY | 1 | 2 | 1 | 1 | 1 | 1 | 1 | 1 |
| | 3 | 4 | | | | | | |

FIG. 7

| STUDENT ID | COUNTRY | NAME | SCHOOL | GRADE/CLASS |
|---|---|---|---|---|
| 012 | JAPAN | abc | ○ SCHOOL | FOURTH GRADE/ CLASS B |
| ... | ... | ... | ... | ... |

12i (STUDENT DB)

SOFT KEYBOARD DISPLAY METHOD AND INFORMATION TERMINAL

TECHNICAL FIELD

The present invention relates to a soft keyboard display method of causing an information terminal such as a tablet terminal to display a soft keyboard, and an information terminal.

BACKGROUND ART

It is widely implemented to cause a display unit of a terminal of a user to display a software keyboard (hereinafter referred to as "soft keyboard") for operating the terminal to input letters and numbers, when accessing a server of a Web site, which provides a Web service, from the terminal of the user who uses the Web site.

In addition, a display method of a multimedia terminal for airport service, in which a skin interface corresponding to a target user group corresponding to a user is called based on a characteristic attribute of the user and the skin interface is loaded on a terminal display page of the user, is considered (for example, refer to Patent Literature 1).

CITATION LIST

Patent Literature

Patent Literature 1: JP2018-534662A

SUMMARY OF INVENTION

Technical Problem

When a user accesses a calculation server that provides any type of calculation service, a terminal of the user may be caused to display a soft keyboard for calculation.

In the related art, a soft keyboard for calculation that is displayed on a user's terminal from a calculation server is configured including various types of calculation keys so that calculation formulas corresponding to needs of all users can be input, from calculation keys for four arithmetic operations, which are basic calculations, to calculation keys for advanced calculations.

An object of the present invention is to provide a soft keyboard display method and an information terminal capable of enabling a soft keyboard having an appropriate configuration to be displayed according to a user's learning situation.

Solution to Problem

A soft keyboard display method according to the present invention is a soft keyboard display method in a server having a communication function with a first information terminal that is used by a first user, the soft keyboard display method including a processor performing: obtaining first user information about the first user; and adjusting an aspect of a soft keyboard to be displayed on the first information terminal, based on the first user information about the first user.

BRIEF DESCRIPTION OF DRAWINGS

FIG. 3C shows an example of the soft keyboard generated based on the soft keyboard DB 12d.

FIG. 3D shows an example of the soft keyboard generated based on the soft keyboard DB 12d.

FIG. 4 shows an example of teacher information registered in a teacher DB 12e.

FIG. 5A shows an example of a class-based educational progress table 12f.

FIG. 5B shows an example of the class-based educational progress table 12f.

FIG. 6 shows an example of an educational progress-based key type table 12h.

FIG. 7 shows an example of student information registered in a student DB 12i,

DESCRIPTION OF EMBODIMENTS

Hereinafter, embodiments of the present invention will be described with reference to the drawings.

Figure 1:
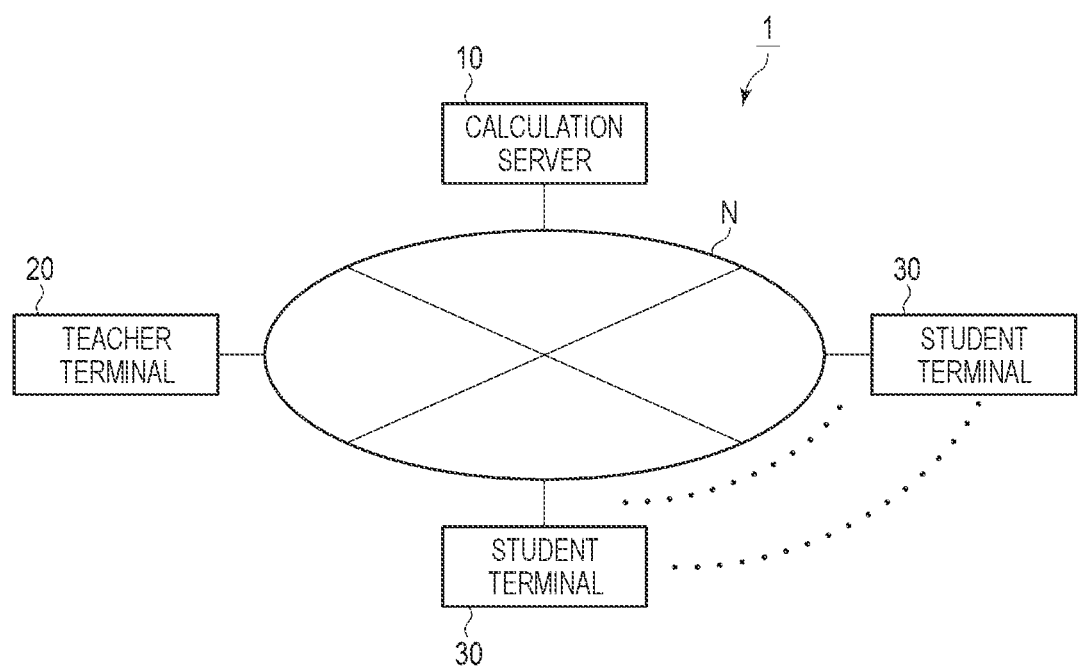
FIG. 1 shows an overall configuration of a calculation server system 1 according to an embodiment of a soft keyboard display method and an information terminal of the present invention.

FIG. 1 shows an overall configuration of a calculation server system 1 according to an embodiment of the soft keyboard display method and the information terminal of the present invention.

Figure 2:
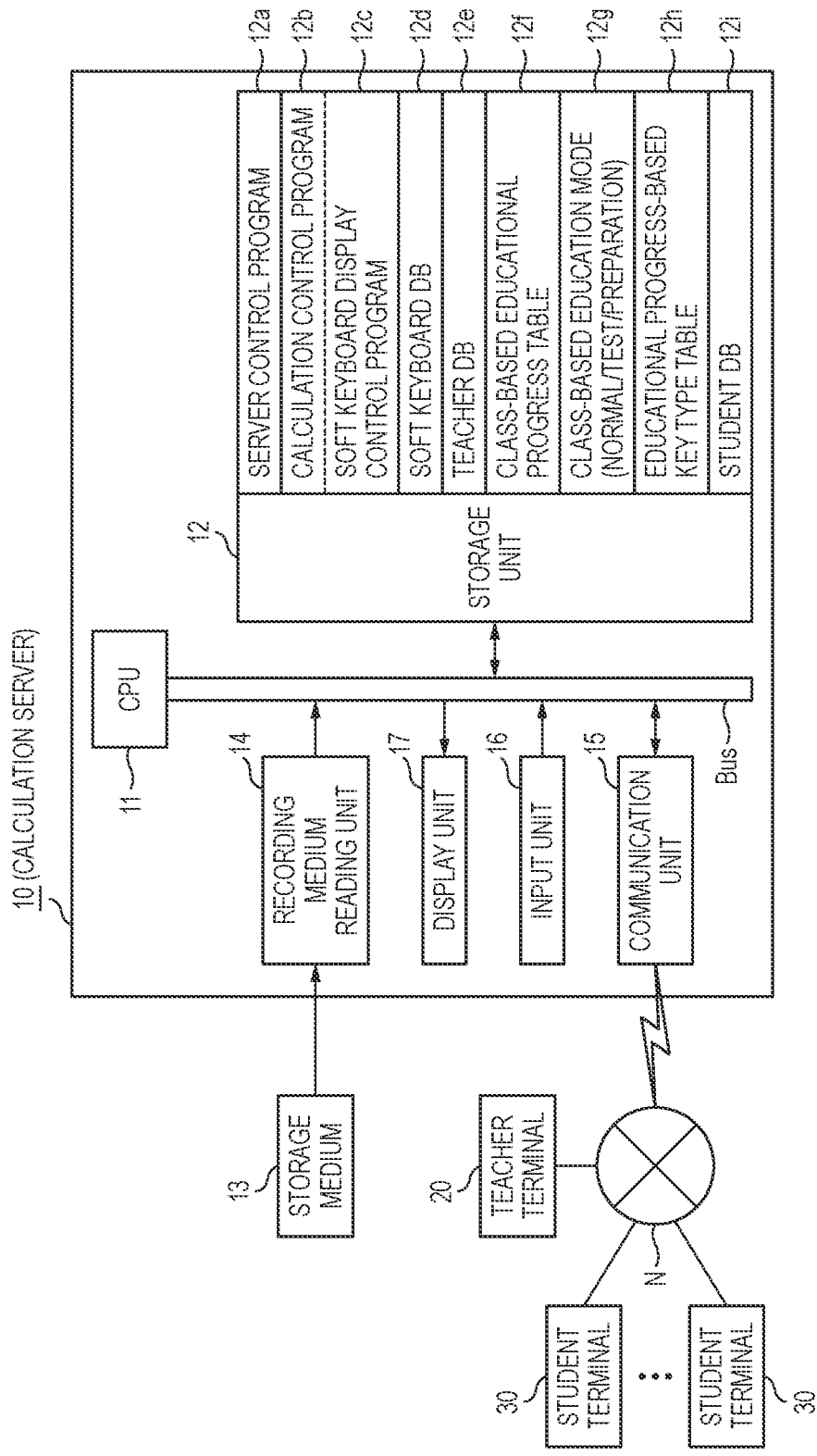
FIG. 2 is a block diagram showing a configuration of an electronic circuit of a calculation server 10.

FIG. 2 is a block diagram showing a configuration of an electronic circuit of a calculation server 10.

The calculation server system 1 of the embodiment is described on the assumption of an aspect in which a calculation function provided by a calculation server 10 is used by a teacher terminal 20 (i.e., a second information terminal that is used by a second user) and a student terminal 30 (i.e., a first information terminal that is used by a first user) capable of communicably connecting to each other via a communication network N.

A calculation server 10 includes a control unit (CPU: Central Processing Unit) 11, and a storage unit (Memory) 12, a recording medium reading unit 14, a communication unit 15, an input unit (Keyboard) 16, and a display unit (Display) 17 are connected to the control unit 11 via a system and data bus (Bus). The calculation server 10 has calculation functions including an input of an arbitrary calculation formula, a calculation of the input calculation formula, and an output of a calculation result, in response to access from each user terminal such as a teacher terminal 20 and a student terminal 30 via a communication network N.

Although not shown, similarly to the calculation server 10, the teacher terminal 20 and the student terminal 30 each have a control unit (CPU, i.e., an adjustment means for adjusting an aspect of a soft keyboard, based on received soft keyboard information), a storage unit (Memory), a communication unit (i.e., a communication means capable of receiving soft keyboard information based on first user information about a first user from an external device), a touch panel-type display unit (Touch panel-Display, i.e., a display means capable of displaying a soft keyboard). The teacher terminal 20 and the student terminal 30 are each constituted by an information terminal such as a tablet terminal, and each have at least an input/output function with respect to the calculation server 10.

The control unit 11 of the calculation server 10 is configured to control an operation of each unit of the circuit, in accordance with a server control program 12a and a calculation control program 12b (including a soft keyboard display control program 12c) stored in advance in the storage unit 12 such as a hard disk and a flash ROM. Note that, data of the programs 12a and 12b stored in the storage unit 12 may be program data read by the recording medium reading unit 14 from an external recording medium 13 such as a CD-ROM and a memory card or program data downloaded from a program server (not shown) on the communication network N via the communication unit 15.

In the storage unit 12 of the calculation server 10, in addition to a program storage area in which the data of the respective programs 12a, 12b and 12c is stored, a data storage area in which a soft keyboard DB (Data Base) 12d (refer to FIGS. 3A to 3D), a teacher DB 12e (refer to FIG. 4), a class-based educational progress table 12f (refer to FIGS. 5A and 5B), a class-based education mode 12g, an educational progress-based key type table 12h (refer to FIG. 6), a student DB 12l (refer to FIG. 7), various operation data and the like are stored is secured.

The server control program 12a is a system program responsible for overall control of the calculation server 10, including data reading control in the recording medium reading unit 14, data communication control in the communication unit 15, data input control in the input unit 16, and data display control in the display unit 17.

Figure 8:
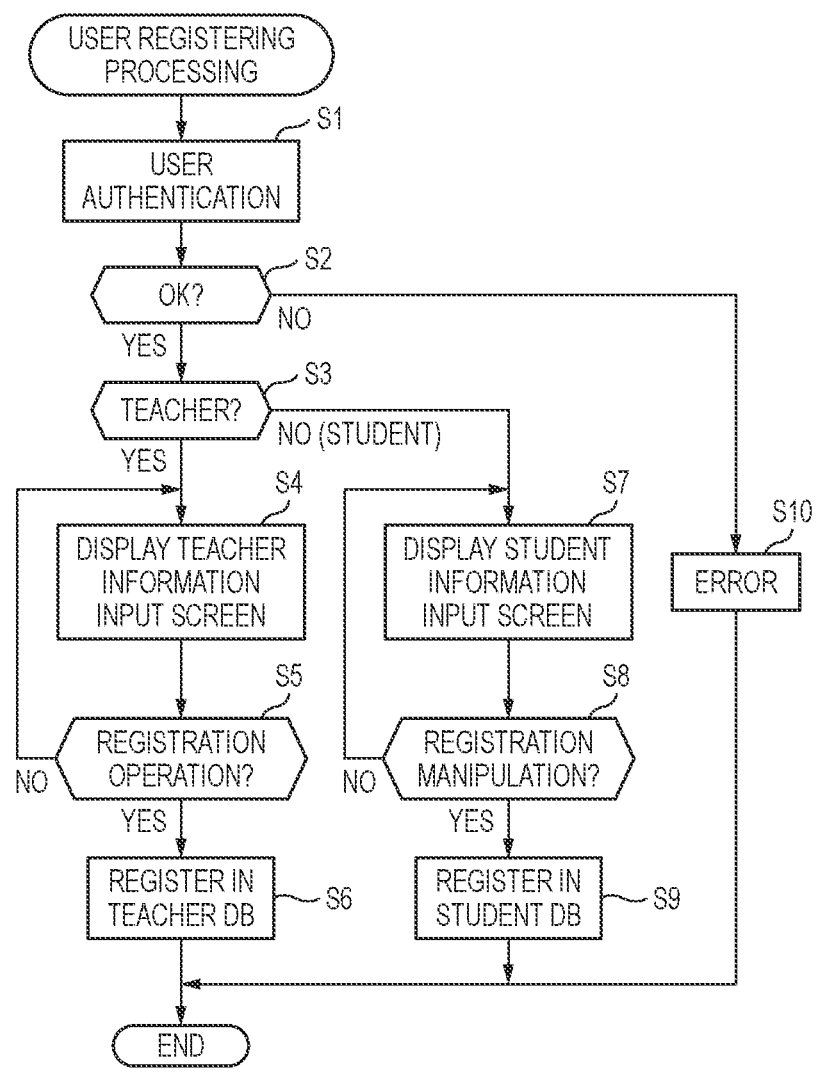
FIG. 8 is a flow chart showing user registration processing that is executed by a control unit 11 of the calculation server 10.

The calculation control program 12b (including the soft keyboard display control program 12c) includes a program for registering the teacher terminal 20 or student terminal 30 in the teacher DB 12e or student DB 12i, as a user terminal accessible to the calculation server 10 (refer to FIG. 8). In addition, the calculation control program 12b includes a program for updating the class-based educational progress table 12f of a class for which a teacher, who is a user of the teacher terminal 20, is responsible (refer to FIG. 9). In addition, the calculation control program 12b includes a program for setting the class-based education mode 12g of the class for which the teacher, who is a user of the teacher terminal 20, is responsible (refer to FIG. 9).

Figure 10:
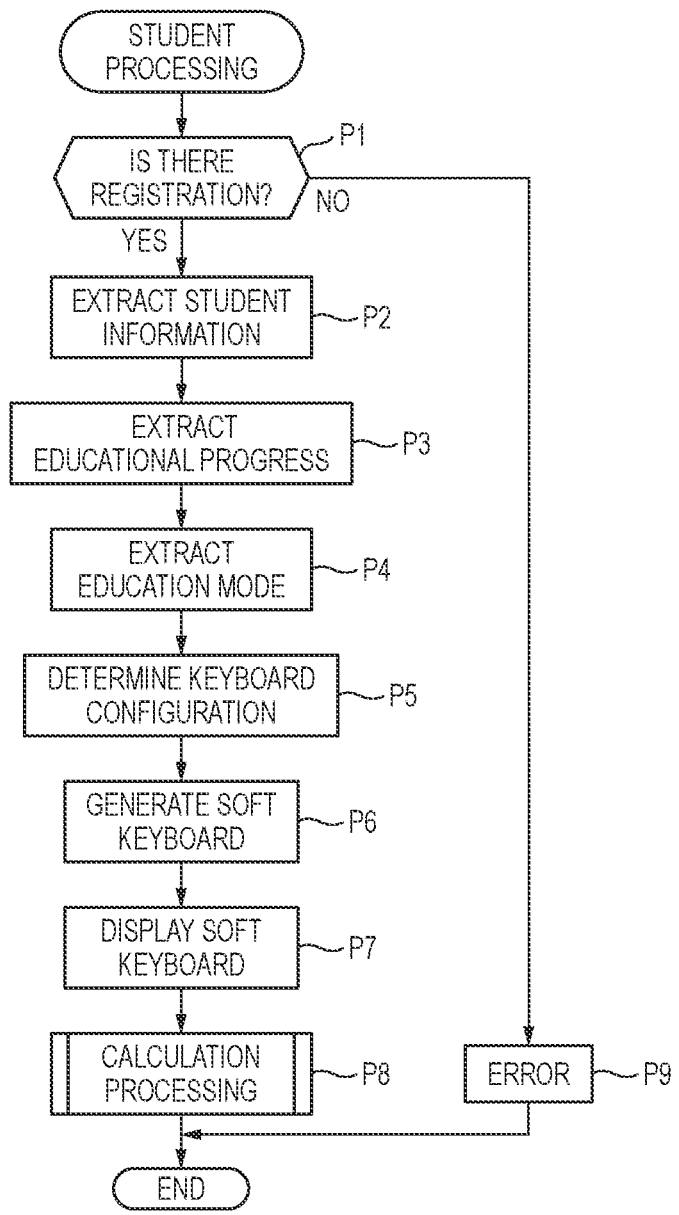
FIG. 10 is a flow chart showing student terminal correspondence processing that is executed by the control unit 11 of the calculation server 10.

In addition, the calculation control program 12b includes a program for extracting data of educational progress and data of education mode corresponding to a student who is a user of the student terminal 30 from the class-based educational progress table 12f and contents of the class-based education mode 12g, a program for determining a configuration of the soft keyboard including calculation keys corresponding to the extracted educational progress and education mode, based on the educational progress-based key type table 12h and the soft keyboard DB 12d, and a program for generating and displaying display data of the determined soft keyboard on the student terminal 30 (refer to FIG. 10).

Further, the calculation control program 12b includes a program for executing calculation processing corresponding to a calculation formula input in response to an operation on the soft keyboard displayed on the student terminal 30, and causing the student terminal 30 to display data of a calculation result (refer to FIG. 10).

Figure 3A:
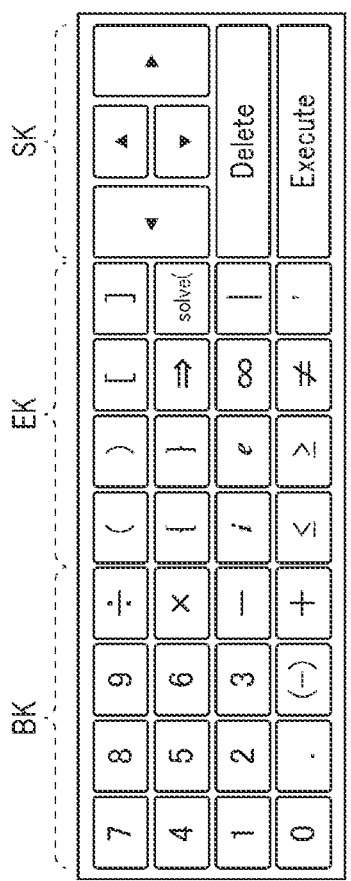
FIG. 3A shows an example of a soft keyboard generated based on a soft keyboard DB 12d.
Figure 3B:
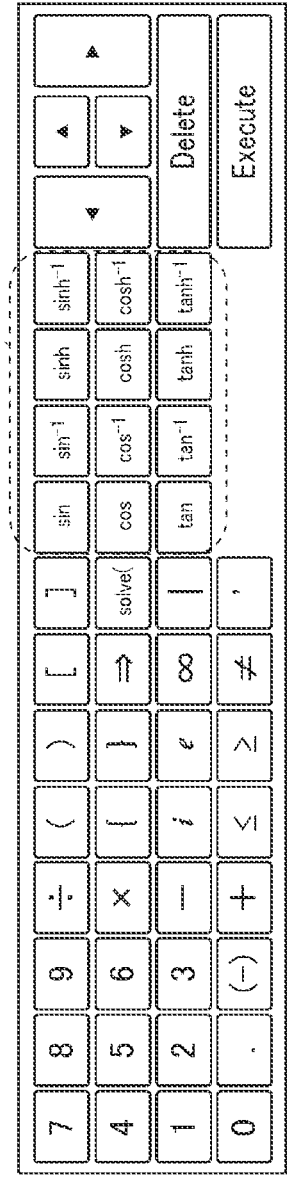
FIG. 3B shows an example of the soft keyboard generated based on the soft keyboard DB 12d.

FIGS. 3A to 3D show examples of a soft keyboard generated based on the soft keyboard DB 12d. FIG. 3A shows a soft keyboard generated by combining a common operation key group SK with a four arithmetic operations key group Bk and an equation key group EK including an inequality, FIG. 3B shows a soft keyboard generated by adding a trigonometric function key group TK to the soft keyboard of FIG. 3A, FIG. 3C shows a Japanese soft keyboard JPK generated by combining Japanese syllabary keys and numeric keys, and FIG. 3D shows an alphabetic soft keyboard ALK generated by combining alphabetic keys and numeric keys.

The soft keyboard DB 12d includes data of part images corresponding to various keys such as character keys for inputting various characters, numeric keys for inputting numbers, calculation keys for inputting various calculation symbols, cursor keys, a delete key, an execute key, etc., and, for example, the various soft keyboards as shown in FIGS. 3A to 3D are configured and generated based on the data of part images of various keys included in the soft keyboard DB 12d.

FIG. 4 shows an example of teacher information registered in the teacher DB 12e.

In the teacher DB 12e, for each teacher who uses the calculation server 10, each data of a teacher ID, a name, a school name (including school types of elementary school, middle school, high school, and university) and a class in charge, as teacher information about the teacher, is associated and stored.

FIGS. 5A and 5B show examples of the class-based educational progress table 12f.

In the class-based educational progress table 12f, information indicating an educational progress corresponding to each grade with respect to a subject of a lesson that is conducted in a class is described as a list of titles indicating learning units of the subject, for a school of the teacher who uses the calculation server 10 and each class of the school.

The class-based educational progress table 12f shown in FIG. 5A is opened by the teacher terminal 20 each time the lesson of each learning unit described in the table 12f is completed according to the progress of the lesson conducted in the class, and is updated with a check mark CH being added to a title of the completed learning unit, in response to an operation on the teacher terminal 20, as shown in FIG. 5B.

Note that, FIGS. 5A and 5B show the class-based educational progress table 12f for mathematics, but can be applied to other subjects such as physics and chemistry.

The class-based education mode 12g is three education modes (normal/test/preparation) that are set according to an operation on the teacher terminal 20, corresponding to a class in charge of the teacher registered in the teacher DB 12e. A normal mode is set at normal times such as during a normal lesson, a test mode is set at the time of conducting a test, and a preparation mode is set at the time of making students prepare their lesson.

FIG. 6 shows an example of the educational progress-based key type table 12h.

In the educational progress-based key type table 12h, key types that need to be arranged in the soft keyboard are set corresponding to items of the educational progress of schools and grades described in the class-based educational progress table 12f.

For example, in the educational progress-based key type table 12h shown in FIG. 6, as the key type that needs to be arranged in the soft keyboard corresponding to each grade of an elementary school, keys for four arithmetic operations (four arithmetic operations key group BK in FIG. 3A) are set, and as the key type that needs to be arranged in the soft keyboard corresponding to each grade of a university, keys for four arithmetic operations (four arithmetic operations key group BK in FIG. 3A), keys for equation calculation (equation key group EK in FIG. 3A), keys for trigonometric function calculation (trigonometric function key group TK in FIG. 3B), keys for exponential logarithm calculation (not shown), keys for graph calculation (not shown), and keys for program calculation (not shown) are set.

Note that, in the educational progress-based key type table 12h shown in FIG. 6, the example in which the educational progress is divided into units of all grades of each school, such as an elementary school, a middle school, a high school and a university, is shown. However, the educational progress may be divided into units of learning units of each school and grade described in the class-based educational progress table 12f shown in FIGS. 5A and 5B, and a key type that needs to be arranged in the soft keyboard in a unit of the learning unit may be finely set.

FIG. 7 shows an example of student information that is registered in the student DB 12i.

In the student DB 12i, for each student who uses the calculation server 10, each data of a country, a student ID, a name, a school name (including school types of an elementary school, a middle school, a high school, and a university), and a grade/class, as student information about the student, is associated and stored. That is, the first user information may include one or more of school type information, grade information, learning unit information, and country information about the first user.

In the calculation server 10 configured as described above, the control unit 11 is configured to control an operation of each unit of the circuit in accordance with commands described in the server control program 12a and the calculation control program 12b (including the soft keyboard display control program 12c), and software and hardware cooperatively operate to implement a user registration function, a teacher terminal correspondence function, and a student terminal correspondence function (including a soft keyboard display function and a calculation function) as described in the following operation descriptions.

Next, operations of calculation server system 1 in some embodiments will be described.

First Embodiment

FIG. 8 is a flow chart showing user registration processing that is executed by the control unit 11 of the calculation server 10.

<Processing of Registering Teacher Terminal 20 in Calculation Server 10>

In the calculation server 10, when a connection request is received from the teacher terminal 20, the control unit 11 executes user authentication processing, based on a password for teacher or student stored in advance in the storage unit 12, as a user who can use the calculation server 10 (step St).

When it is determined that user authentication is OK (Yes in step S2), the control unit 11 communicatively connects to the teacher terminal 20 that is a connection request source. The control unit 11 determines whether the terminal of the communicatively connected partner is the teacher terminal 20 or the student terminal 30, based on the password determined as being authentication OK (step S3). Note that, the method of authenticating the user and the method of determining whether the connected terminal is the teacher terminal 20 or the student terminal 30 may be other methods.

When it is determined that the terminal of the connected partner is the teacher terminal 20 (Yes in step S3), the control unit 11 transmits a teacher information input screen for enabling the user of the teacher terminal 20 to input teacher information including "teacher ID", "name", "school" and "class in charge" to the teacher terminal 20 for display (step S4).

When "teacher ID", "name", "school", and "class in charge" are input in accordance with the displayed teacher information input screen and an operation for instructing registration is performed on the teacher terminal 20 (Yes in step S5), the control unit 11 of the calculation server 10 stores the input teacher information including "teacher ID", "name", "school" and "class in charge" in the teacher DB 12e (refer to FIG. 4) (step S6).

Thereby, the teacher terminal 20 is registered in the calculation server 10, as the teacher terminal 20 of the teacher who uses the calculation server 10.

<Processing of Registering Student Terminal 30 in Calculation Server 10>

In the calculation server 10, when it is determined that the terminal of the connected partner is the student terminal 30 (No in step S3), in response to a connection request from the student terminal 30, the control unit 11 transmits a student information input screen for enabling the user of the student terminal 30 to input student information including "student ID", "country", "name", "school" and "grade/class" to the student terminal 30 for display (step S7).

When "student ID", "country", "name", "school" and "grade/class" are input in accordance with the displayed student information input screen and an operation for instructing registration is performed on the student terminal 30 (Yes in step S8), the control unit 11 of the calculation server 10 stores the input student information including "student ID", "country", "name", "school" and "grade/class" in the student DB 12l (refer to FIG. 7) (step S9).

Thereby, the student terminal 30 is registered in the calculation server 10, as the student terminal 30 of the student who uses the calculation server 10.

On the other hand, when it is determined in step S2 of the user registration processing by the control unit 11 that user authentication is NG (No in step S2), the control unit 11 notifies a connection error to the teacher terminal 20 or student terminal 30 that is a connection request source (step S10).

Figure 9:
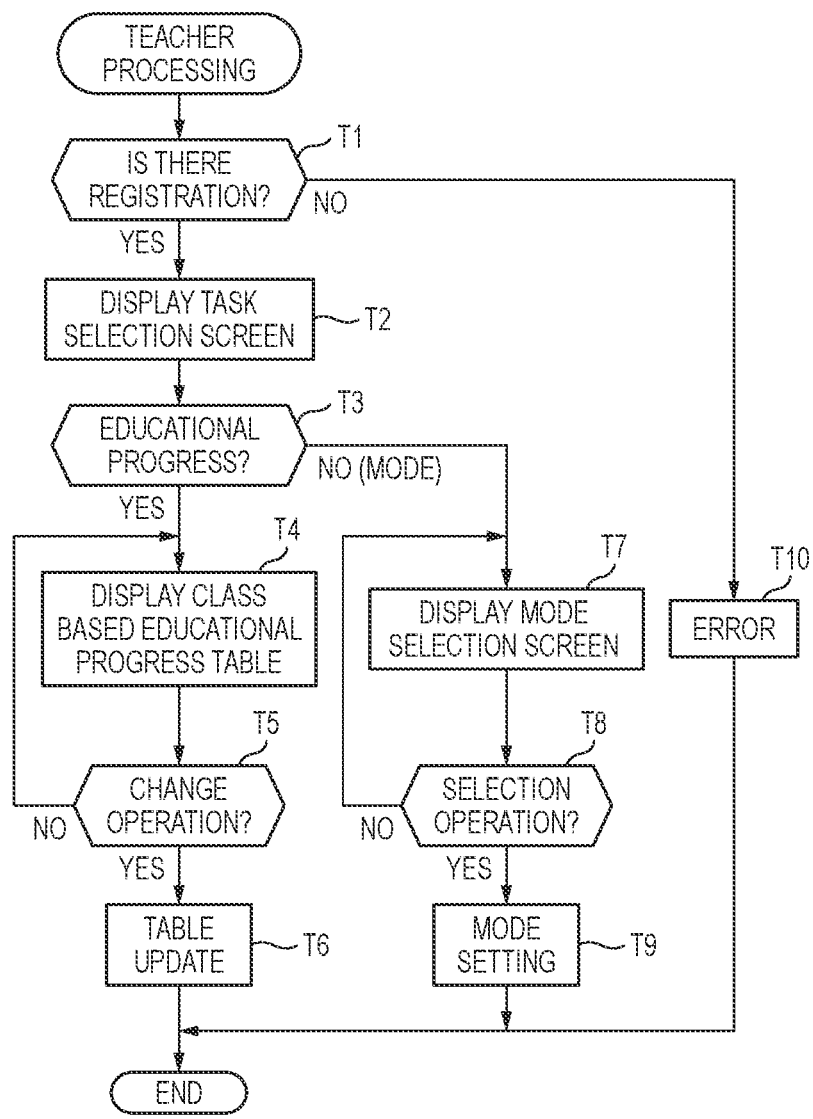
FIG. 9 is a flow chart showing teacher terminal correspondence processing that is executed by the control unit 11 of the calculation server 10.

FIG. 9 is a flow chart showing teacher terminal correspondence processing that is executed by the control unit 11 of the calculation server 10.

<Processing of Updating Class-Based Educational Progress Table 12f for Each Learning Unit of Conducted Lesson>

In the control unit 11 of the calculation server 10, when it is determined that the connected teacher terminal 20 is the teacher terminal 20 registered in the teacher DB 12e (Yes in step T1), the control unit 11 transmits a task selection screen for enabling the teacher to select which task of update of the class-based educational progress table 12f (refer to FIGS. 5A and 5B) or setting of the class-based education mode 12g is to be performed to the teacher terminal 20 for display (step T2).

When update of the class-based educational progress table 12f is selected as a task target on the teacher terminal 20, in accordance with the displayed task selection screen (Yes in step T3), the control unit 11 of the calculation server 10 transmits the class-based educational progress table 12f corresponding to the school, grade, and class in charge of the teacher, based on "school" and "class in charge" registered in the teacher DB 12*e* corresponding to the teacher ID of the connected teacher terminal 20, to the teacher terminal 20 for display (step T4).

For example, as shown in FIG. 5A, in a state in which the class-based educational progress table 12*f* of B class of the fourth grade in ○ school in which the teacher conducted lesson is displayed on the teacher terminal 20, the learning unit of "trigonometric function" in Mathematics IIB is completed, so that the check mark CH is added corresponding to the completed learning unit "trigonometric function" and a change is instructed according to the teacher's operation, as shown in FIG. 5B (Yes in step T5). Then, the control unit 11 of the calculation server 10 overwrites and updates the changed class-based educational progress table 12*f* in which the check mark CH is added to the learning unit "trigonometric function", in the storage unit 12 (step T6).

Thereby, the teacher operates the teacher terminal 20 to update the class-based educational progress table 12*f* corresponding to the class in charge registered in the calculation server 10 each time each learning unit is completed by conducting lessons in the class in charge.

<Processing of Setting Class-Based Education Mode 12*g*>

When setting of the class-based education mode 12*g* is selected as a task target on the teacher terminal 20, according to the task selection screen displayed by the processing of step T2 of the calculation server 10 (No in step T3), the control unit 11 of the calculation server 10 transmits a mode selection screen for enabling the teacher to select one of a normal mode, a test mode or a preparation mode to the teacher terminal 20 for display (step T7).

When any one of the normal mode, the test mode or the preparation mode is selected on the teacher terminal 20, in response to a teacher's operation in accordance with the displayed mode selection screen (Yes in step T8), the control unit 11 of the calculation server 10 sets the data of the class-based education mode 12*g* corresponding to the class in charge of the teacher as data of the selected education mode (step T9).

Thereby, the teacher sets the education mode of the class in charge, for example, to the normal mode when conducting a normal lesson, to the test mode when conducting a test, and to the preparation mode when making students prepare their lessons.

On the other hand, when it is determined in step T1 of the teacher terminal correspondence processing by the control unit 11 that the connected teacher terminal 20 is the teacher terminal 20 not registered in the teacher DB 12*e* (No in step T1), the control unit 11 notifies a registration error to the teacher terminal 20 (step T10).

FIG. 10 is a flow chart showing student terminal correspondence processing that is executed by the control unit 11 of the calculation server 10.

When the control unit 11 of the calculation server 10 determines that the connected student terminal 30 is the student terminal 30 registered in the student DB 12*l* (Yes in step P1), the control unit 11 extracts the student information "country", "school", and "grade/class" registered in the student DB 12*i* corresponding to the student ID of the connected student terminal 30 (step P2).

In addition, the control unit 11 extracts the class-based educational progress table 12*f* corresponding to "school" and "grade/class" of the student extracted in step P2, and obtains the learning unit that the student has completed, based on the check mark CH added to the class-based educational progress table 12*f* (step P3).

In addition, the control unit 11 extracts data of the class-based education mode 12*g* corresponding to "school" and "grade/class" of the student extracted in step P2, and obtains the education mode (normal mode, test mode or preparation mode) set in "school" and "grade/class" of the student (step P4).

The control unit 11 determines a configuration of the soft keyboard suitable for the student, in accordance with key types corresponding to the educational progress of the school and grade set in the educational progress-based key type table 12*h* (refer to FIG. 6), based on the completed learning unit corresponding to "school" and "grade/class" of the student and obtained in step P3 and the education mode corresponding to "school" and "grade/class" of the student and obtained in step P4 (step P5). That is, based on the first user information about the first user, a key type available to the first user is determined, and the aspect of the soft keyboard to be displayed on the first information terminal is adjusted corresponding to the determined key type.

For example, when the education mode is set to "normal mode", a configuration of the soft keyboard suitable for the student to learn the currently obtained contents is determined, in accordance with the key types as set in the educational progress-based key type table 12*h* corresponding to the completed learning units of "school" and "grade/class" of the student.

That is, as shown in FIG. 5B, it is assumed that the latest completed learning unit of "school" and "grade/class" of the student is "trigonometric function" of Mathematics IIB in Class B of fourth grade (first grade of high school) of ○ school and keys for four arithmetic operations to keys for trigonometric function calculation are set as key type that needs to be arranged in the soft keyboard, in the educational progress-based key type table 12*h*. Then, as shown in FIG. 3B, a configuration of the soft keyboard in which the common operation key group SK is combined with the four arithmetic operation key group BK, the equation key group ELK and the trigonometric function key group TK is determined, in accordance with the key type (from keys for four arithmetic operations to keys for trigonometric function calculation) as set in the educational progress-based key type table 12*h*.

Therefore, when the education mode is set to "normal mode", a configuration of the soft keyboard is determined in which only key groups of types, which are necessary according to the learning contents up to the learning units that the student has taken lessons so far, are arranged.

In addition, for example, when the education mode is set to "test mode", a configuration of the soft keyboard suitable for a student to take a test of a recently obtained learning unit is determined in accordance with the key types other than a key type set corresponding to the latest completed learning unit, i.e., the key types set corresponding to learning units preceding the completed learning unit by at least one unit, among the key types set in the educational progress-based key type table 12*h* corresponding to the completed learning units of "school" and "grade/class" of the student.

That is, as shown in FIG. 5B, it is assumed that the latest completed learning unit of "school" and "grade/class" of the student is "trigonometric function" of Mathematics IIB in Class B of fourth grade (first grade of high school) of ○ school and keys for four arithmetic operations to keys for trigonometric function calculation are set as a key type that needs to be arranged in the soft keyboard, in the educational progress-based key type table 12*h*. Then, as shown in FIG. 3A a configuration of the soft keyboard in which the common operation key group SK is combined with the four arithmetic operation key group BK and the equation key group EK is determined, in accordance with the key types (from keys for four arithmetic operations to keys for equation calculation) other than the key type (keys for trigonometric function calculation) set corresponding to the latest completed learning unit, among the key types (from keys for four arithmetic operations to keys for trigonometric function calculation) set in the educational progress-based key type table 12*h*.

Therefore, when the education mode is set to "test mode", a configuration of the soft keyboard for a test is determined in which the remaining key groups are arranged with excluding the key group of types necessary according to the learning content of the latest learning unit, which is a test target that the student has taken lessons recently, from the key groups of types necessary according to the learning contents up to the learning units that the student has taken lessons so far. That is, when the test information is obtained, a key type available to the first user is determined based on second user information obtained by excluding the educational progress information of at least one progress from the first user information about the first user, and an aspect of the soft keyboard to be displayed on the first information terminal is adjusted in accordance with the determined key type.

In addition, for example, when the education mode is set to "preparation mode", a configuration of the soft keyboard suitable for a student to prepare a next learning unit is determined in accordance with a key type, in which a key type set corresponding to a next learning unit to be obtained is added to key types set in the educational progress-based key type table 12*h* corresponding to the completed learning units of "school" and "grade/class" of the student, i.e. a key type set corresponding to a learning unit following the completed learning unit by at least one unit. That is, when the preparation information is obtained, a key type available to the first user is determined based on third user information obtained by adding the educational progress information of at least one progress to the first user information about the first user, and an aspect of the soft keyboard to be displayed on the first information terminal is adjusted in accordance with the determined key type.

That is, as shown in FIG. 5B, it is assumed that the latest completed learning unit of "school" and "grade/class" of the student is "trigonometric function" of Mathematics IIB in Class B of fourth grade (first grade of high school) of ○ school and keys for four arithmetic operations to keys for trigonometric function calculation are set as a key type that needs to be arranged in the soft keyboard, in the educational progress-based key type table 12*h*. Then, a configuration of the soft keyboard in which the common operation key group SK is combined with the four arithmetic operation key group TK, the equation key group EK, the trigonometric function key group TK and the exponential logarithm key group (not shown) is determined, in accordance with a key type (from keys for four arithmetic operations to keys for exponential logarithm calculation) in which a key type (keys for exponential logarithm calculation) set corresponding to a next learning unit to be obtained is added to the key type (from keys for four arithmetic operations to keys for trigonometric function calculation) set in the educational progress-based key type table 12*h*.

Therefore, when the education mode is set to "preparation mode", a configuration of the soft keyboard for preparation is determined in which a key group of a type necessary according to a learning content of a learning unit to be taken next time is added to the key groups of types necessary according to the learning contents up to the learning units that the student has taken lessons so far.

Note that, in the "test mode", it may be arbitrarily set what extent the key group corresponding to the preceding learning unit is to be excluded for testing from the key group of the soft keyboard necessary according to the latest learning unit currently completed, when setting the class-based education mode 12*g* with the teacher terminal 20. Similarly, in the "preparation mode", it may be arbitrarily set what extent the key group corresponding to the following learning unit is to be added for preparation to the key group of the soft keyboard necessary according to the latest learning unit currently completed, when setting the class-based education mode 12*g* with the teacher terminal 20. That is, the test information or preparation information regarding the first user may be set by the second user.

When the configuration of the soft keyboard is determined in step P5, the control unit 11 generates image data of the soft keyboard corresponding to the determined configuration of the soft keyboard (step P6), based on the data of part images of various keys stored in the soft keyboard DB 12*d*, and transmits the generated image data of the soft keyboard to the student terminal 30 for display (step P7).

The control unit 11 of the calculation server 10 executes calculation processing of a calculation formula input from the student terminal 30, in response to the student's key operation on the soft keyboard displayed on the student terminal 30 in step P7, and transmits data of a calculation result to the student terminal 30 for display (step P8).

On the other hand, when it is determined in step P1 of the student terminal correspondence processing by the control unit 11 that the connected student terminal 30 is the student terminal 30 not registered in the student DB 12*i* (No in step P1) the control unit 11 notifies a registration error to the student terminal 30 (step P9).

[Summary of First Embodiment]

According to the calculation server system 1 of the first embodiment, when the student terminal 30 is connected to the calculation server 10, the calculation server 10 obtains, as the school-, grade- and class-based learning unit, the educational progress information relating to, for example, mathematics of a student who is a user of the student terminal 30, based on the student DB 12*i* and the class-based educational progress table 12*f*. Further, the calculation server 10 determines the key type necessary for calculation corresponding to the educational progress information about the student, based on the educational progress-based key type table 12*h*, generates a soft keyboard corresponding to the determined key type, and causes the connected student terminal 30 to display the generated soft keyboard.

This makes it possible to display a soft keyboard having an appropriate configuration corresponding to the user's learning situation.

In addition, the learning unit as the educational progress set in the class-based educational progress table 12*f* is updated by the operation from the teacher terminal 20 connected to the calculation server 10 each time the learning unit for which the lesson has been conducted is completed. Therefore, it is possible to display a soft keyboard having a configuration that always appropriately corresponds to changes in learning situation of the student.

Further, when the class-based education mode 12*g* is set to "test mode" by the operation from the teacher terminal 20, the calculation server 10 determines the necessary key type, according to the educational progress information in which the completed educational progress information of at least one learning unit has been excluded from the current educational progress information about the student. Thereby, it is possible to cause the student terminal 30 to display a soft keyboard having an appropriate configuration in which calculation keys for solving a calculation problem of a unit test have been excluded, for example, in a unit test after completion of a certain learning unit.

In addition, when the class-based education mode 12g is set to "preparation mode" by the operation from the teacher terminal 20, the calculation server 10 determines the necessary key type, according to the educational progress information in which the next educational progress information of at least one learning unit has been added to the current educational progress information about the student. Therefore, when making the student prepare a next learning unit, for example, it is possible to cause the student terminal 30 to display a soft keyboard having an appropriate configuration in which keys for calculation necessary for learning the next learning unit have been added.

Second Embodiment

In the calculation server system 1 of a second embodiment, when the student terminal 30 is connected to the calculation server 10, the calculation server 10 generates the Japanese soft keyboard JPK as shown in 3C or the alphabetic soft keyboard ALK as shown in FIG. 3D, based on the data of "country" included in the student information corresponding to the student terminal 30, and causes the student terminal 30 to display the generated soft keyboard. That is, based on the first user information about the first user, a key type available to the first user is determined, and the aspect of the soft keyboard to be displayed on the first information terminal is adjusted corresponding to the determined key type.

That is, according to the student terminal correspondence processing shown in FIG. 10, when "country" included in the student information extracted from the student DB 12i is "Japan" (step P2), the control unit 11 of the calculation server 10 determines a configuration of the soft keyboard, as the configuration of the Japanese soft keyboard JPK shown in FIG. 3C (step P5). The control unit 11 generates image data of the soft keyboard JPK corresponding to the determined configuration of the Japanese soft keyboard JPK (step P6), based on the data of part images of various keys stored in the soft keyboard DB 12d, and transmits the generated image data of the soft keyboard JPK to the student terminal 30 for display (step P7).

In addition, when "country" included in the student information extracted from the student DB 12i is a country other than Japan (step P2), the control unit 11 determines a configuration of the soft keyboard, as the configuration of the alphabetic soft keyboard ALK shown in FIG. 3D (step P5). The control unit 11 generates image data of the soft keyboard ALK corresponding to the determined configuration of the alphabetic soft keyboard ALK (step P6), and transmits the generated image data of the soft keyboard ALK to the student terminal 30 for display (step P7).

In either case of causing the student terminal 30 to display the Japanese soft keyboard JPK or the alphabetic soft keyboard ALK, the control unit 11 of the calculation server 10 may execute following processing, similarly to the student terminal correspondence processing of the first embodiment.

That is, based on "grade" as the educational progress included in the student information in the student DB 12i and the educational progress-based key type table 12h, the control unit 11 configures a soft keyboard for calculation of a type necessary according to the "grade" (steps P2 to P5), and causes the student terminal 30 to display the configured soft keyboard for calculation in combination with the Japanese soft keyboard JPK or the alphabetic soft keyboard ALK.

Note that, when causing the student terminal 30 to display the Japanese soft keyboard JPK, the Japanese soft keyboard JPK with a Chinese character conversion key added thereto may be displayed according to "grade" as the educational progress included in the student information.

[Summary of Second Embodiment]

According to the calculation server system 1 of the second embodiment, when the student terminal 30 is connected to the calculation server 10, the calculation server 10 obtains country information about a student who is a user of the student terminal 30, based on the student DB 12i. Then, the calculation server 10 generates the Japanese soft keyboard JPK including Japanese syllabary keys when the country information about the student is "Japan" or generates the alphabetic soft keyboard ALK including alphabetic keys when the country information is a country other than "Japan", and causes the student terminal 30 to display the generated soft keyboard. In this case, the Japanese soft keyboard JPK or the alphabetic soft keyboard ALK may be displayed on the student terminal 30 in combination with the soft keyboard for calculation generated based on the learning progress information about the student described in the first embodiment.

Thereby, it is possible to display a soft keyboard having an appropriate configuration, according to a country of residence and learning situation of the user, for example.

The method of each processing by the calculation server 10 described in each of the above embodiments, such as the user registration processing shown in the flow chart of FIG. 8, the teacher terminal correspondence processing shown in the flow chart of FIG. 9, and the student terminal correspondence processing shown in the flow chart of FIG. 10, is all a program that can be executed by a processor (CPU), and can be stored in a medium of an external storage device such as a memory card (a ROM card, a RAM card, etc.), a magnetic disk (floppy (registered trademark) disk, a hard disk, etc.), an optical disk (a CD-ROM, a DVD, etc.) and a semiconductor memory, and can be distributed. The processor (CPU) of the information device can read the program recorded on the medium of the external recording device into a storage device, and control the operations according to the read program, thereby implementing the user registration function, the teacher terminal correspondence function, and the student terminal correspondence function (including a soft keyboard display function and a calculation function), and executing similar processing according to the above-described methods.

In addition, program data for implementing each method can be transmitted in a program code form over a communication network (N), and the program data can be loaded into an information device and stored into a storage device from a program server connected to the communication network (N), such that it is possible to implement the user registration function, the teacher terminal correspondence function, and the student terminal correspondence function (including a soft keyboard display function and a calculation function) described above.

The present invention is not limited to each embodiment, and can be variously modified at the implementation stage without departing from the gist of the present invention. Further, each embodiment includes inventions of various stages, and various inventions can be extracted by appropriate combinations of a plurality of disclosed constituent requirements. For example, even if some constituent requirements are deleted from all the constituent requirements shown in each embodiment or some constituent requirements are combined in different forms, the configurations obtained by deleting or combining the constituent requirements can be extracted as inventions as long as the problem described in the part of 'solution to problem' can be solved and the effects described in the part of the 'advantage effects of invention' are achieved.

The present application is based on Japanese Patent Application No. 2020-159839 filed on Sep. 24, 2020, the contents of which are incorporated herein by reference. Furthermore, in the below, the inventions described in the original claims of the present application are added.

<Supplementary Note 1>

A soft keyboard display method in a server having a communication function with a first information terminal that is used by a first user, the soft keyboard display method including a processor performing: obtaining first user information about the first user; and adjusting an aspect of a soft keyboard to be displayed on the first information terminal, based on the first user information about the first user.

Supplementary Note 2>

The soft keyboard display method described in the supplementary note 1, wherein the first user information includes one or more of school type information, grade information, learning unit information, and country information about the first user.

<Supplementary Note 3>

The soft keyboard display method described in the supplementary note 1 or 2, including determining a key type available to the first user based on the first user information about the first user, and adjusting the aspect of the soft keyboard to be displayed on the first information terminal according to the determined key type.

<Supplementary Note 4>

The soft keyboard display method described in the supplementary note 3, including: obtaining test information or preparation information regarding the first user; in a case where the test information is obtained, determining the key type available to the first user based on second user information obtained by subtracting educational progress information of at least one progress from the first user information about the first user, and the aspect of the soft keyboard to be displayed on the first information terminal is adjusted according to the determined key type: and in a case where the preparation information is obtained, determining the key type available to the first user based on third user information obtained by adding educational progress information of at least one progress to the first user information about the first user, and adjusting the aspect of the soft keyboard to be displayed on the first information terminal according to the determined key type.

<Supplementary Note 5>

The soft keyboard display method described in the supplementary note 4, wherein the preparation information regarding the first user is set by a second user.

<Supplementary Note 6>

The soft keyboard display method described in any one of the supplementary notes 1 to 5, wherein the aspect of the soft keyboard is adjusted by adding or subtracting a key type to be included in the soft keyboard, and wherein the key type includes keys for four arithmetic operations and one or more key types other than the keys for four arithmetic operations, among the keys for four arithmetic operations, keys for equation calculation, keys for trigonometric function calculation, keys for exponential logarithm calculation, keys for graph calculation, and keys for program calculation.

<Supplementary Note 7>

The soft keyboard display method described in any one of the supplementary notes 1 to 6, wherein the first user information about the first user is set by a second information terminal that is used by a second user and communicatively connected to the server.

<Supplementary Note 8>

An information terminal including: communication means capable of receiving soft keyboard information based on first user information about a first user from an external device; display means capable of displaying a soft keyboard; and adjustment means for adjusting an aspect of the soft keyboard, based on the received soft keyboard information.

<Supplementary Note 9>

The information terminal described in the supplementary note 8, wherein the soft keyboard information based on the first user information about the first user is set by another information terminal that is used by a second user.

REFERENCE SIGNS LIST

1: calculation server system
10: calculation server
11: control unit (CP U: processor)
12$a$: server control program
12$b$: calculation control program
12$c$: soft keyboard display control program
12$d$: soft keyboard DB
12$e$: teacher DB
12$f$: class-based educational progress table
12$g$: class-based education mode
12$h$: educational progress-based key type table
12$i$: student DB
13: external recording medium
14: recording medium reading unit
15: communication unit
N: communication network
20: teacher terminal
30: student terminal
BK: four arithmetic operations key group
EK: equation key group
TK: trigonometric function key group
SK: common operation key group
JPK: Japanese soft keyboard
ALK: alphabetic soft keyboard

The invention claimed is:

1. A soft keyboard display method for a first information terminal used by a first user, which is executed by control data transmitted by a processor of a server having a communication function with the first information terminal to the first information terminal, comprising:
    extracting first grade information on a first grade of the first user from a database that stores identification information of the first user in correspondence with the first grade of the first user;
    obtaining test information for the first user by entering the extracted first grade information on the first grade into a predetermined table; and
    in response to obtaining the test information;
        setting a one or more groups of calculation keys for inputting a calculation symbol in a key type table corresponding to a second grade information obtained by subtracting at least one educational progress information item from the first grade information related to groups of calculation keys the first user, wherein the at least one educational progress information being subtracted includes a latest completed learning unit in the first grade information; and adjusting an appearance of entire of the soft keyboard including partial images of the groups of calculation keys.

2. The soft keyboard display method according to claim 1, wherein the first grade information includes one or more of school type information, grade information, study unit information, and country information about the first user.

3. The soft keyboard display method according to claim 1, wherein the test information regarding the first user is set by a second user.

4. The soft keyboard display method according to claim 1, wherein adjusting the appearance of the entire of the soft keyboard comprises adding or subtracting a key type to be included in the soft keyboard, and wherein the key type comprises:
keys for four arithmetic operations and one or more key types other than the keys for four arithmetic operations, among the keys for four arithmetic operations,
keys for equation calculation,
keys for trigonometric function calculation,
keys for exponential logarithm calculation,
keys for graph calculation, and
keys for program calculation.

5. The soft keyboard display method according to claim 1, wherein the first grade information is set by a second information terminal that is used by a second user and communicatively connected to the server.

6. An information terminal used by a first user, the information terminal having a communication function with a processor of a server, the first information terminal comprising:

a processor configured to:
extract first grade information on a first grade of the first user from a database that stores identification information of the first user in correspondence with the first grade of the first user;
obtaining test information for the first user by entering the extracted first grade information on the first grade into a predetermined table; and
in response to obtaining the test information:
set a one or more groups of calculation keys for inputting a calculation symbol in a key type table corresponding to a second grade information obtained by subtracting at least one educational progress information item from the first grade information related to the first user, wherein the at least one educational progress information being subtracted includes a latest completed learning unit in the first grade information; and
adjust an appearance of entire of an soft keyboard including partial images of the groups of calculation keys.

7. The information terminal according to claim 6, wherein the first grade information is set by another information terminal that is used by a second user.

8. A soft keyboard display method performed by a processor of a server having a communication function with a first information terminal used by a first user, the soft keyboard display method comprising:
extracting first grade information on a first grade of the first user from a database that stores identification information of the first user in correspondence with the first grade of the first user; and obtaining preparation information for the first user based on the first grade information on the first grade entered into a predetermined table;
in response to obtaining the preparation information:
setting one or more groups of calculation keys for inputting a calculation symbol in a key type table corresponding to a second grade information obtained by adding at least one educational progress information item to the first grade information related to the first user, wherein the at least one educational progress information being added includes a next learning unit to be obtained after a latest completed learning unit in the first grade information; and
adjusting an appearance of entire of the soft keyboard including partial images of the groups of calculation keys.

9. The soft keyboard display method according to claim 8, wherein the first grade information includes one or more of school type information, grade information, study unit information, and country information about the first user.

10. The soft keyboard display method according to claim 8, wherein the preparation information regarding the first user is set by a second user.

11. The soft keyboard display method according to claim 8, wherein adjusting the appearance of the entire of the soft keyboard comprises adding or subtracting a key type to be included in the soft keyboard, and wherein the key type comprises:
keys for four arithmetic operations and one or more key types other than the keys for four arithmetic operations, among the keys for four arithmetic operations,
keys for equation calculation,
keys for trigonometric function calculation,
keys for exponential logarithm calculation,
keys for graph calculation, and
keys for program calculation.

12. The soft keyboard display method according to claim 8, wherein the first grade information is set by a second information terminal that is used by a second user and communicatively connected to the server.

13. An information terminal comprising:
a processor configured to:
extract first grade information on a first grade of a first user from a database that stores identification information of the first user in correspondence with the first grade of the first user; and
obtaining preparation information for the first user based on the information on the first grade entered into a predetermined table;
in response to obtaining the preparation information:
set a one or more groups of calculation keys for inputting a calculation symbol in a key type table corresponding to a second grade information obtained by adding at least one educational progress information item to the first grade information related to the first user, wherein the at least one educational progress information being added includes a next learning unit to be obtained after a latest completed learning unit in the first grade information; and adjust an appearance of entire of an soft keyboard including partial images of the groups of calculation keys.

14. The information terminal according to claim 13, wherein the preparation information is set by another information terminal that is used by a second user.

* * * * *